United States Patent
Piazza et al.

(10) Patent No.: US 8,433,935 B2
(45) Date of Patent: Apr. 30, 2013

(54) ENERGY MANAGEMENT OF REMOTELY CONTROLLABLE DEVICES ASSOCIATED WITH A WORKSPACE BASED ON USERS SCHEDULED ACTIVITIES IN A CALENDAR APPLICATION AND USERS' CURRENT NETWORK ACTIVITIES

(75) Inventors: William J Piazza, Holly Springs, NC (US); Justin P. Bandholz, Cary, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 12/237,474

(22) Filed: Sep. 25, 2008

(65) Prior Publication Data

US 2010/0077241 A1 Mar. 25, 2010

(51) Int. Cl.
*G06F 1/32* (2006.01)
*G06F 1/00* (2006.01)

(52) U.S. Cl.
USPC .......................... 713/320; 713/300; 713/324

(58) Field of Classification Search .................. 713/300, 713/320, 324
See application file for complete search history.

(56) References Cited

U.S. PATENT DOCUMENTS

| | | | |
|---|---|---|---|
| 4,060,123 A | 11/1977 | Hoffman et al. | |
| 4,160,917 A | 7/1979 | Wald | |
| 4,703,171 A | 10/1987 | Kahl et al. | |
| 5,682,949 A | 11/1997 | Ratcliffe et al. | |
| 5,909,378 A | 6/1999 | De Milleville | |
| 6,196,468 B1 | 3/2001 | Young | |
| 6,349,883 B1 | 2/2002 | Simmons et al. | |
| 7,464,279 B2 * | 12/2008 | Motoyama | 713/320 |
| 2003/0149866 A1 | 8/2003 | Neuman et al. | |
| 2004/0174970 A1 * | 9/2004 | Rutter | 379/188 |
| 2008/0277486 A1 * | 11/2008 | Seem et al. | 236/49.3 |
| 2008/0296981 A1 * | 12/2008 | Yaakov | 307/149 |
| 2009/0083167 A1 * | 3/2009 | Subbloie | 705/34 |
| 2010/0179850 A1 * | 7/2010 | Fuller et al. | 705/8 |

\* cited by examiner

*Primary Examiner* — Thomas Lee
*Assistant Examiner* — Terrell Johnson
(74) *Attorney, Agent, or Firm* — Thomas E. Tyson; Jeffrey L. Streets

(57) ABSTRACT

A method and computer program product for controlling energy utilization includes receiving user activities from each of a plurality of users into one or more software application, associating each user activity with a defined workspace having one or more remotely controllable electronic devices, and controlling energy utilization of the one or more electronic devices within each defined workspace according to the user activities associated with the defined workspace. Energy utilization is reduced in a defined workspace during a time period that there is no user activity associated with the workspace. Optionally, the step of receiving user activities may include detecting that a user has logged onto a remote computer that is not located within the defined workspace, or users inputting activities into a software application, such as one or more instances of an electronic calendar.

12 Claims, 4 Drawing Sheets

ENERGY MANAGEMENT OF REMOTELY CONTROLLABLE DEVICES ASSOCIATED WITH A WORKSPACE BASED ON USERS SCHEDULED ACTIVITIES IN A CALENDAR APPLICATION AND USERS' CURRENT NETWORK ACTIVITIES

BACKGROUND OF THE INVENTION

1. Field of the Invention

The present invention relates to methods of saving energy.

2. Background of the Related Art

Businesses, universities, and governmental agencies use a large amount of energy to operate office buildings. Energy is necessary to heat the building in the winter, cool the building in the summer, and provide electricity all year long. Electricity is needed to power modern lighting systems, telecommunications equipment, computer stations and network, document production, presentation facilities and the like. Although the building may be heated using a gas burner rather than electrical heating, the consumption of gas still represents a significant expense and environmental burden.

Businesses generally desire to conserve energy resources at least to save money, if not also to reduce their impact on the environment. Traditional energy conservation techniques include prudent building design and insulation, use of energy efficient equipment, eliminating unnecessary use of the equipment. The most practical of these techniques is the elimination of unnecessary use.

For example, excessive or unnecessary use of energy to heat or cool a building or a workspace within a building may be limited by using a microprocessor-based thermostat. Programming the thermostat to control the building or workspace at a first temperature during official office hours and a second temperature while the office is closed can lead to significant savings. However, not only can a thermostat operate to vary the temperature as a function of time, but separate thermostats may be used to control the temperature in different zones throughout an office building. Still, these systems are generally easy to manually operate and over-ride the programming as user needs require.

Furthermore, a business manager or designated employee may be given the responsibility to turn off equipment at the end of the work day. While beneficial, these efforts are usually less than comprehensive and do not accommodate individual differences in work habits.

Some businesses are now implementing nontraditional work-weeks or allowing more employees to work from home. These types of programs save employees gasoline and commute time, with a possible result of reducing environmental impact and improving the employee's quality of life. Although the business will benefit indirectly from these programs, the business may still consume roughly the same amount of energy whether these programs are implemented or not.

BRIEF SUMMARY OF THE INVENTION

One embodiment of the present invention provides a method for controlling energy utilization. The method comprises receiving user activities from each of a plurality of individual users into one or more software application, associating each user activity with a defined workspace having one or more remotely controllable electronic devices, and controlling energy utilization of the one or more electronic devices within each defined workspace according to the user activities that are associated with the defined workspace. The method preferably includes reducing energy utilization in one or more defined workspaces during a time period that there is no user activity associated with the one or more defined workspaces. Optionally, the step of receiving user activities may include detecting that a user has logged onto a remote computer that is not located within the defined workspace. Alternatively, the step of receiving user activities may include users inputting activities into a software application, such as one or more instances of an electronic calendar.

The step of reducing energy utilization may differ from one defined workspace to another. For example, energy utilization may be reduced by adjusting an HVAC damper that supplies warm or cool air to the defined workspace, turning off lights within the defined workspace, turning off electrical outlets within the defined workspace, turning off telephone jacks within the defined workspace, managing power consumption by network equipment in response to the computer network activity, or combinations thereof.

Another embodiment provides a computer program product for controlling energy utilization. The computer program product comprises a computer useable medium having computer usable program code embodied therewith. The computer useable program code comprises computer usable program code configured to receive user activity information from each of a plurality of individual user nodes on a network, computer usable program code configured to associate each user activity with a defined workspace having one or more remotely controllable electronic devices, and computer usable program code configured to control energy utilization of the one or more electronic devices within each defined workspace according to the activity information associated with the defined workspace.

DETAILED DESCRIPTION OF THE INVENTION

Figure 1:
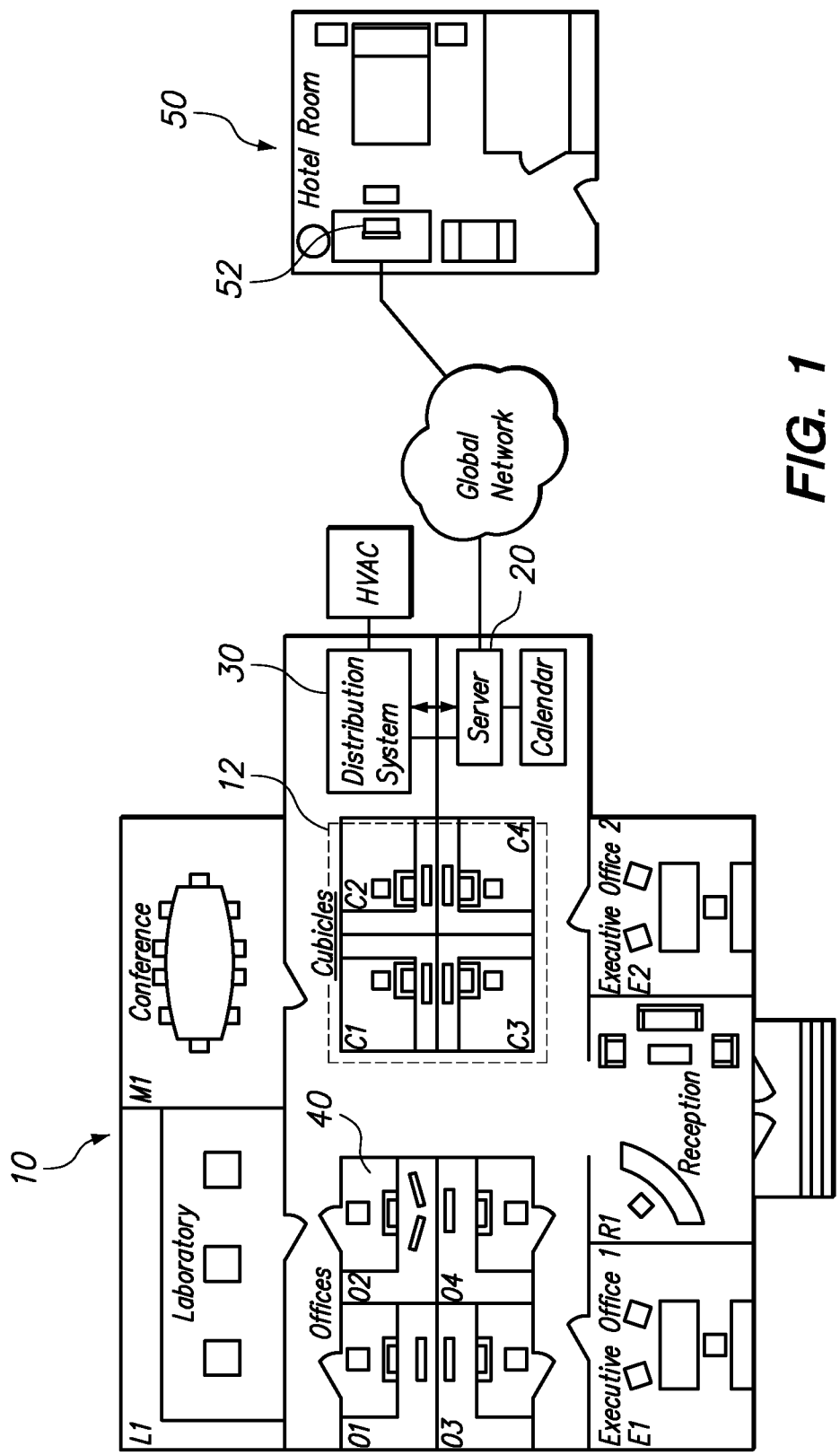
FIG. 1 is a plan view of an office building and a hotel room both having computers that can access a network server.

One embodiment of the present invention provides a method for controlling energy utilization. The method comprises receiving user activities from each of a plurality of individual users into one or more software application, associating each user activity with a defined workspace having one or more remotely controllable electronic devices, and controlling energy utilization of the one or more electronic devices within each defined workspace according to the user activities that are associated with the defined workspace.

Businesses, universities, governmental agencies and other types of entities with large number of employees can significantly reduce energy costs by determining that an employee is working from home and by taking explicit steps to reduce energy costs associated with the employee's office workspace. In many regards "working on the road" is very similar to "working from home" as it relates to the energy needs of an employee's office and the possible energy savings according to the present invention are the same. Similarly, even employees who are on-site may be working in a lab or other area of the building such that it is possible to invoke energy saving techniques associated with their office during this period. Accordingly, the method preferably includes reducing energy utilization in one or more defined workspaces during a time period that there is no user activity associated with the one or more defined workspaces. Because many of the methods and methods steps described in this disclosure involve an employee's access and/or use of a computer network, an employee may be referred to as a user. Still further, the term "user" is intended to encompass employees, volunteers, contractors, and any other categorization of people that would have reason to spend time in one of the workspaces of the entity and gain access to the entity's network in the ordinary course of day to day activities.

In another embodiment, the step of receiving user activities may include detecting that a user has logged onto a remote computer that is not located within the defined workspace. This is an indication that the user is working from home, working on the road, working in another part of the entity's premises, or at least not presently working in the defined workspace. For example, a network server may run a software application that detects when an authorized network user has established a virtual private network (VPN) from a remote location or from a specific IP address. Detecting that a specific user has logged on from a remote computer means that they are not presently involved in an activity within any of the other workspaces. Accordingly, if the user has previously calendared activities or system defaults to a predetermined activity, the remote logon may cause the energy utilization application to over-ride or deactivate any prior activities inconsistent with the remote logon. Optionally, detecting that the user has subsequently logged off from the remote computer may cause the energy utilization application to again observe or reactivate the user's calendared or default activities.

In a still further embodiment, the step of receiving user activities may include users inputting activities into a software application, such as a website, one or more instances of an electronic calendar or email program, or other software interface. For example, each of the users in an entity may already have an electronic calendar program on their computer and the electronic calendar may already be enabled to share this information across the network. Accordingly, an energy utilization application may leverage this information as a basis for controlling energy utilization in workspaces associated with the user's activities. In one implementation, an energy utilization application includes an activities association record or table that identifies a workspace to be associated with each of a list of user-selectable activities found in the user calendar. In this manner, the energy utilization application can use the calendar and the activities association record to identify which workspace and electronic devices or resources the user needs throughout each day. Electronic devices that are not needed may be turned off.

Furthermore, an activities association record may include activities that involve groups of individuals, such as a group as small as a department or as large as an enterprise. A single calendar entry for a group activity would cause the energy utilization application to adjust resources for the entire group. Accordingly, a group workspace may encompass each of the workspaces associated with the individual users that are members of the group. For example, department meetings, Friday afternoon picnics for a number of departments, and even enterprise-wide or site specific holidays may be entered into a shared calendar and have a wide impact on energy savings throughout the group workspace. Furthermore, the calendar program may be used to send out invitations to each individual of a group requesting their attendance in a group event. The act of the individual accepting or declining the invitation may determine whether the entry is placed into their individual instance of the calendar application.

In yet another embodiment, the calendar or the energy utilization system may establish default activities for a given user during periods when there is no user-calendared activity or detected user logon. For example, a calendar may be setup so that a user activity defaults to 'work from home' each day until such time as the user swipes a security badge to gain access into a building or room, or logs onto the network from an access point in the building or room. Although the energy utilization application can detect that a user has logged off or shut down a computer in a defined workspace, it is cautioned that this information may not be a good indicator that the user has left the workspace or that the system should over-ride subsequent calendared activities. However, this is an issue where business procedures regarding computer usage may be established in coordination with energy utilization application.

The step of reducing energy utilization may differ from one defined workspace to another. For example, energy utilization may be reduced by adjusting an HVAC damper that supplies warm or cool air to the defined workspace, turning off lights within the defined workspace, turning off electrical outlets within the defined workspace, turning off telephone jacks within the defined workspace, managing power consumption by network equipment in response to the computer network activity, or combinations thereof. Specifically, network routers and switches may be reconfigured, where possible, to reduce the number of powered network components needed in the corporate infrastructure and turn off or power manage unneeded network equipment. Furthermore, turning off electrical outlets may be used to effectively turn off printers, scanners, plotters, CRTs, desktop computers, radios, fans or any other electrical device that might be found in the office. For the purpose of safety and productivity, it is preferred that the energy utilization application can change the state of the remotely controllable electronic devices without locking or disabling these devices, so that a user can enter the workspace and use any equipment necessary. For example, an individual should be able to turn on lights despite the absence of any calendared activity for that workspace.

Furthermore, the energy reduction techniques listed above may be implemented fully or partially. For example, a system administrator or individual user may choose to have certain outlets in an office that are continuously supplied with power regardless of the current user activity (e.g., to power a fax machine) while other outlets are managed for reducing energy costs. The selection of remotely controllable electronic devices, or their respective electrical outlet, may be established in a workspace associations record or table, which identifies a plurality of workspaces and a customizable list of the electronic devices that may be turned off or modified within each workspace.

Preferably, energy utilization is controlled in one or more defined workspaces during a time period that there is no user activity associated with the one or more defined workspaces. These time periods may be initiated and terminated in real-time by detecting network logons and logoffs or the time periods may be established by entry of a user activity into an electronic calendar. In either situation, or in some combination of real-time and calendared activities, if there is no activity associated with a particular workspace then energy utilization may be controlled.

Yet another embodiment recognizes that more than one user may be involved in activities within a common workspace. This may occur where a group of users have gathered in a conference room for a meeting, or where users occupy cubicles that rely upon the same bank of lights and/or electrical feed to their outlets. Since there may be diminishing returns to installing remotely controllable switches on each individual light or outlet, it is expected that lights and outlets may often be controlled (i.e., turned on or off) in groups. Accordingly, it is the granularity of the control over electronic devices that determines the boundaries of a workspace. If there is common control over lights and outlets within a cluster of cubicles, then the energy utilization application should not turn off these resources unless there are no activities associated with the workspace. In other words, any calendared activity or detected logon associated with the workspace would prevent the energy utilization application from turning off the electronic devices within that workspace.

The methods of the invention may be further supplemented by other steps to improve efficiency and address practical realities. For example, heating and air conditioning take time to reach establish a new setpoint temperature in a workspace. Therefore, it may be useful for the energy utilization application to turn on heating and air conditioning in a workspace some predetermined period of time prior to a calendared activity. Similarly, it may be practical for the energy utilization application to turn off heating and air conditioning just prior to the end of the latest calendared activity of each day. Still further, the energy utilization application may maintain heating and air conditioning and electrical outlets over short gaps in time between calendared activities. For example, rather than turning off air conditioning and electricity to the user's computer during a one hour period without a calendared activity, such as a lunch break, it is preferable to avoid turning off electronic devices unless the gap in activity is greater than some setpoint period of time.

It should be emphasized that the methods of the present invention do not rely upon simple timers, proximity sensors, and other devices that can detect movement or activity within a workspace. These sensors can fail or lead to false detection, and require accurate installation and maintenance. Rather, the user's activity is detected as a result of network activity and/or scheduling. These network systems are viewed as being more reliable in that the network resources are already being maintained to carry out important office functions.

Another embodiment provides a computer program product for controlling energy utilization. The computer program product comprises a computer useable medium having computer usable program code embodied therewith. The computer useable program code comprises computer usable program code configured to receive user activity information from each of a plurality of individual user nodes on a network, computer usable program code configured to associate each user activity with a defined workspace having one or more remotely controllable electronic devices, and computer usable program code configured to control energy utilization of the one or more electronic devices within each defined workspace according to the activity information associated with the defined workspace. Furthermore, the computer program product may further include computer usable program code configured to carry out any or all of the method steps described herein.

FIG. 1 is a plan view of an office building 10 and a remote access point (i.e., a hotel room) 50 both having computers that can access a network server 20. The building is shown to include a reception area (R1), two executive offices (E1, E2), four standard offices (O1, O2, O3, O4), four cubicles (C1, C2, C3, C4), a laboratory (L1), a conference or meeting room (M1), a computer room for the network server 20 and facilities for an energy distribution system 30. The office building 10 may be divided into defined workspaces which are areas that have independently controllable electronic devices, such as lights, outlets, and dampers. Accordingly, the scope of a workspace will vary from one building to the next. For example, it is preferable to have independent, remotely controllable electronic devices in each of the standard offices (O1-O4) so that each office is a defined workspace and the energy to each of these offices may be controlled on the basis of activities within that office. However, especially in older buildings, it is possible that the four offices (O1-O4) share a common HVAC duct, a common electrical feed and lighting control circuitry, such that the four offices collectively define a single workspace. The method of the invention is equally adaptable to either or both situations. For example, the four offices (O1-O4) may be independent workspaces, while the four cubicles (C1-C4) may form a single workspace 12. A more detailed description of a defined workspace is provided in reference to FIG. 2.

Figure 2:
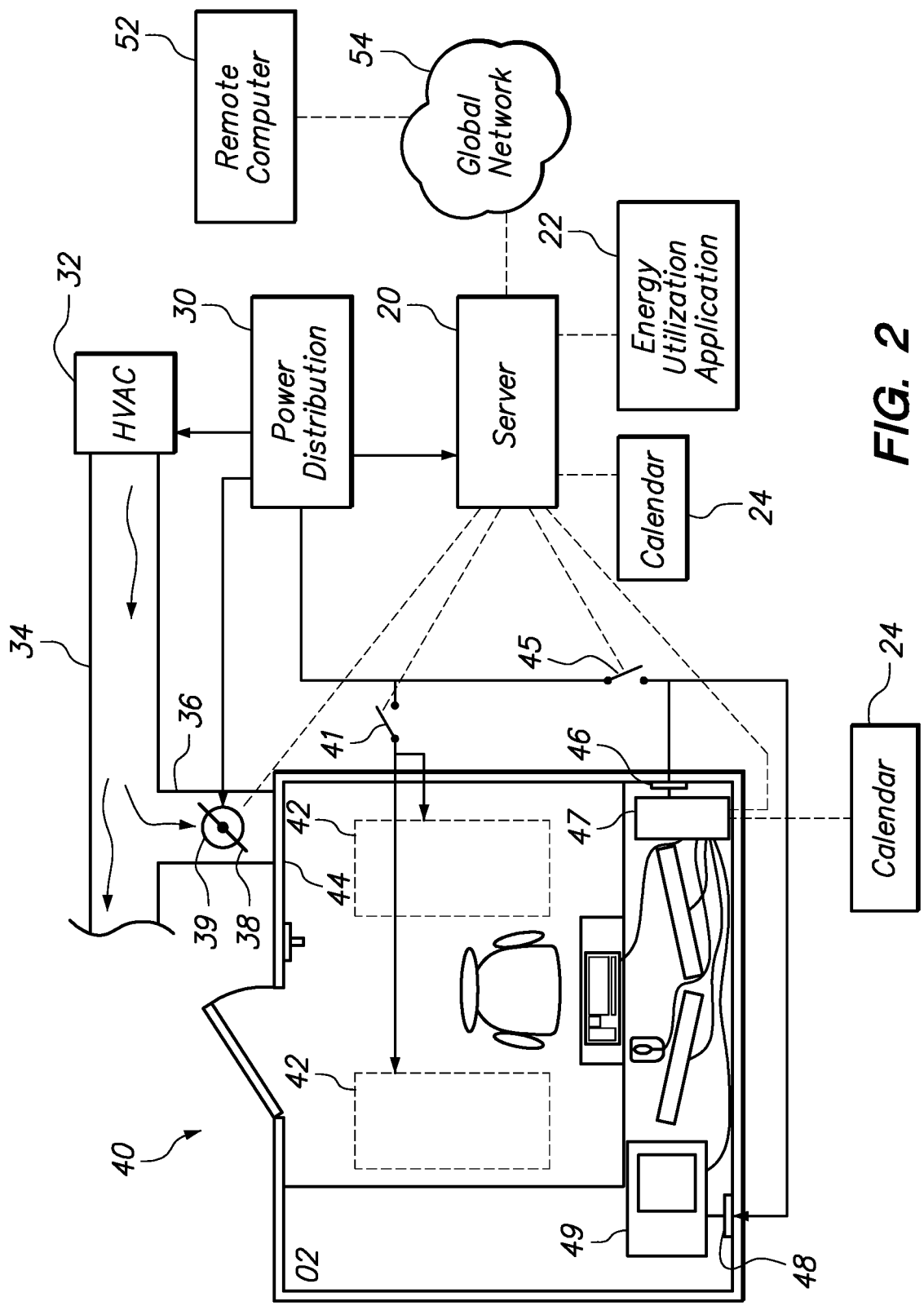
FIG. 2 is a diagram of a defined workspace having a plurality of energy consuming devices and a system for controlling energy utilization by these devices.

FIG. 2 is a diagram of a defined workspace 40 having a plurality of energy consuming devices and a system for controlling energy utilization by these devices. As this particular workspace 40 is an office for an individual user, it has two fluorescent ceiling lights 42 (shown as dashed lines), an HVAC vent 44, a first outlet 46 providing electricity to a computer 47, and a second outlet 48 providing electricity to a printer 49. The lights 42 are on a common circuit with a switch 41 that is remotely controllable by the server 20. Although the communication from the server to the switch is shown as a direct communication, it should be understood that there may be intervening devices for signal conditioning and the like. Similarly, the outlets 46, 48 are on a common circuit with a switch 45 that is remotely controllable by the server. The vent 44 receives air from the HVAC unit 32 via a branch 36 of the ductwork 34. The branch 36 includes a damper 38 coupled to a motor 39 that controllably positions the damper 38, as instructed by the server 20, at a fully open position, a fully closed position, or any position in between.

As previously discussed, the server 20 operates an energy utilization application 22 that monitors user activities and sends out control signals to the remotely controllable electronic devices, here including switches 41, 45 and a damper motor 39. The energy utilization application 22 may obtain input about user activities by detecting network logons and logoffs from local computers, such as computer 47, or remote computers, such as computer 52 which accesses the network server 20 over a global network 54. Furthermore, the energy utilization application 22 may obtain input about user activities from one or more instances of an electronic calendar 24, which may run on individual computers 47 or on the server 22.

Figure 3:
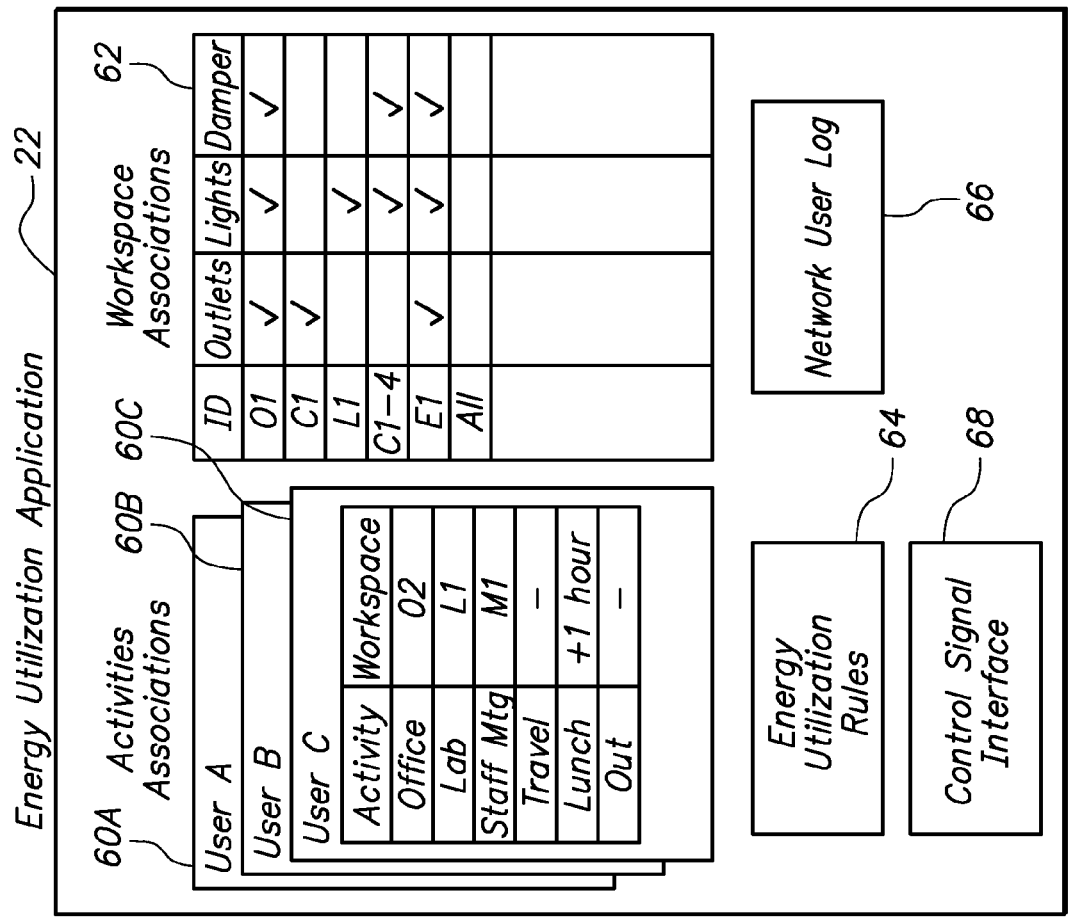
FIG. 3 is a diagram of user calendars and an energy utilization application.
Figure 3:
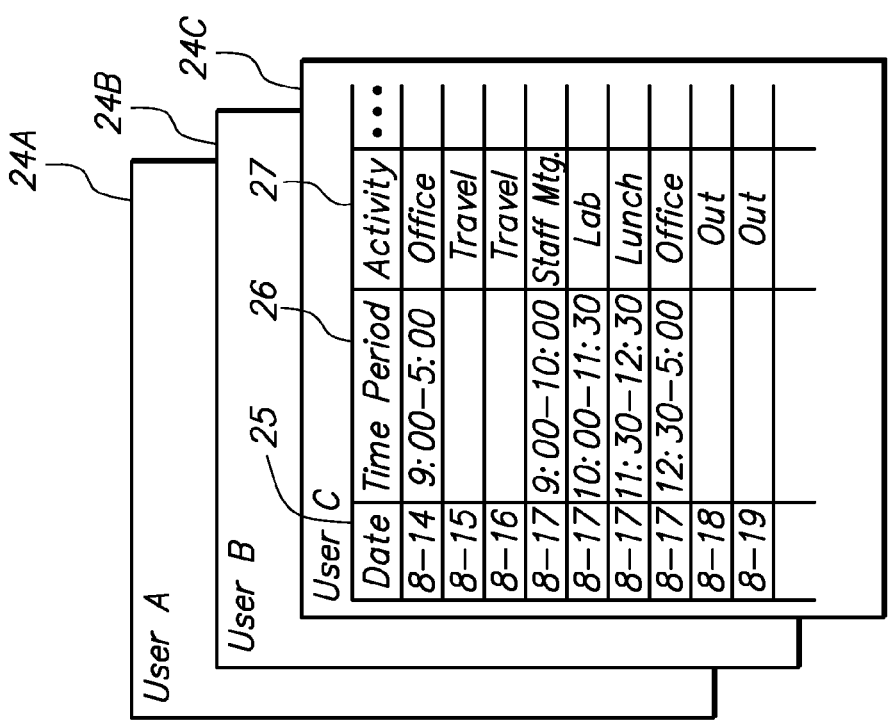

FIG. 3 is a diagram of user calendars 24A-C and the energy utilization application 22. The electronic calendars 24A-C each include one or more entries (rows), where each entry includes a date 25, time period 26 and activity 27. Optionally, the electronic calendars may establish default entries that define the activity when the user has not provided one. For example, the first entry for User C is "office" on 8-24 from 9:00 am to 5:00 pm, so the remaining hours of the day (i.e., midnight to 9:00 am and 5:00 pm to midnight) may default to "out" or simply the absence of an activity. Similarly, any day on the calendar that the user does not provide a calendared activity may default to "out."

The energy utilization application 22 includes various types of files and programs, including an activities associations records 60A-C, a workspace associations record 62, an energy utilization rules module 64, a network user logon status record 66, and a control signal interface 68. The energy utilization rules module 64 uses data from the electronic calendars 24A-C, the activities associations records 60A-C, the workspace associations record 62, and the network user logon status record 66 in order to determine how to control energy utilization via the control signal interface 68. As previously described, the energy utilization rules module 64 obtains and review the calendar entries for a given time period. The workspace associated with each activity during that time period are identified from the activities associations records 60A-C, which includes a separate record for each user since, for example, the activity "office" may involve a difference workspace for each user. Now having identified which workspaces are and aren't being used during the time period, the workspace associations record 62 can be used to identify which controllable electronic devices associated with the relevant workspaces are intended to be turned off in the absence of an activity. These devices may be turned off or otherwise controlled to reduce energy consumption by sending out signals through the control signal interface 68.

Still further, the network user log or status record 66 may be searched for data that could over-ride a calendared entry. For example, if User C was found to have logged on to the network from a remote computer 52 (See FIGS. 1 and 2) at 9:00 on 8-14, then the entry in User C's calendar indicating that User C would be in workspace O2 from 9:00 am to 5:00 pm may be ignored. However, after User C logs off from the remote computer 52, the calendared entries may again be activated, depending upon how an administrator sets up preferences in the energy utilization rules 64.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
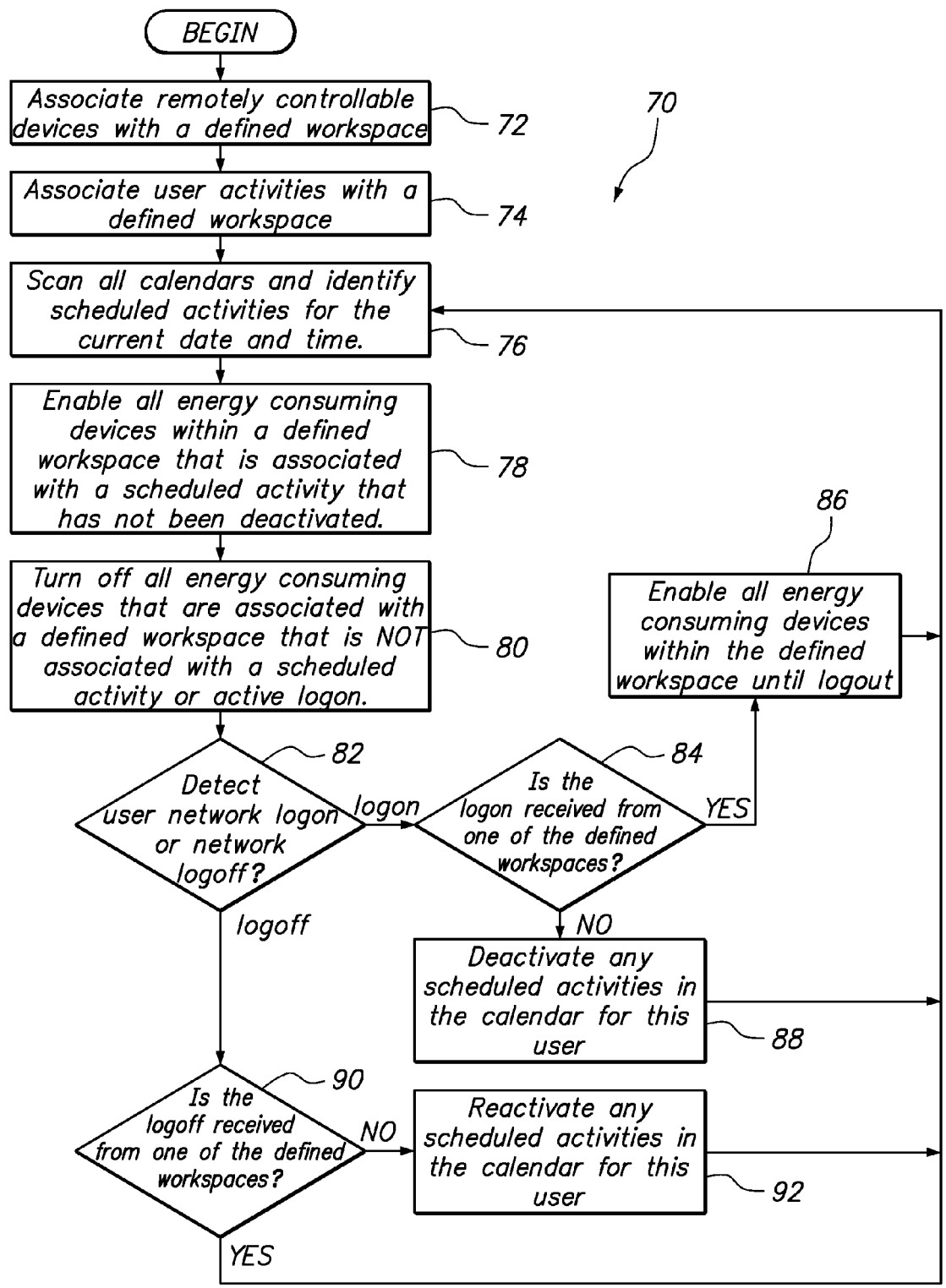
FIG. 4 is a flowchart of a method for controlling energy utilization.

FIG. 4 is a flowchart of a method 70 for controlling energy utilization. After the method begins, step 72 associates remotely controllable devices with a defined workspace. This step may involve manual entry of the associations during system setup. Similarly, setup step 74 associates user activities with a defined workspace. Although setup steps 72, 74 are not shown in the control loop (steps 78-92), it should be recognized that the associations may be edited by a user or administrator as desired.

During routine performance of the control loop, step 76 scans all calendars and identifies scheduled activities for the current date and time. Step 78 enables all electronic devices associated with a defined workspace (according to the workspace associations record 62) that is in turn associated with a scheduled activity (according to the activities associations records 60A-C) that has not been deactivated. Step 80 turns off all energy consuming devices that are associated with a defined workspace that is NOT associated with a scheduled activity or active logon.

In step 82, a user network logon or network logoff is detected. If step 82 detects a logon, then in step 84, it is determined whether the logon was received from one of the defined workspaces. The method enables all energy consuming devices within the defined workspace in step 86 if the logon was received from a defined workspace and, alternatively, deactivates any scheduled activities in the calendar for this user, in step 88 if the logon was received a remote computer outside any of the defined workspaces.

However, if a network logoff is detected in step 82, then step 90 determines whether the logoff was received from one of the defined workspaces. If the logoff was not received from a defined workspace (i.e., it was received from a remote computer), then in step 92, any scheduled activities in the calendar for this user are reactivated (having been deactivated in step 88 during previous iteration of the flowchart).

If step 90 determines that the logoff was received from one of the defined workspaces, then the method returns to step 76. If the logoff leaves no active logons and no scheduled activities associated with the workspace, then the energy consuming devices will be turned off in the next iteration of step 80.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving scheduled user activities from each of a plurality of individual users into one or more electronic calendar program through a software interface;
   associating each user activity with a defined workspace having one or more remotely controllable electronic devices selected from the group consisting of electrical outlets, computers, printers, light fixtures, and combinations thereof; and
   controlling energy utilization of the one or more electronic devices within each defined workspace according to the user activities that are associated with the defined workspace;
   reducing energy utilization in one or more defined workspaces during a time period that there is no user activity associated with the one or more defined workspaces;
   detecting that a user has logged onto a remote computer that is not located within the defined workspace; and
   over-riding any of the scheduled user activities that are inconsistent with logging onto the remote computer.

2. The method of claim 1, wherein the remote computer accesses a network through a virtual private network connection.

3. The method of claim 1, wherein the step of reducing energy utilization includes adjusting an HVAC damper that supplies warm or cool air to the defined workspace.

4. The method of claim 1, wherein the step of reducing energy utilization includes turning off lights within the defined workspace.

5. The method of claim 1, wherein the step of reducing energy utilization includes turning off electrical outlets within the defined workspace.

6. The method of claim 1, wherein the step of reducing energy utilization includes turning off telephone jacks within the defined workspace.

7. The method of claim 1, wherein the user activities include computer network activity, and wherein the step of reducing energy utilization includes managing power consumption by network equipment in response to the computer network activity.

8. The method of claim 7, wherein the step of managing power consumption by network equipment includes reconfiguring a network router or switch.

9. The method of claim 1, wherein the user activities received from two or more of the plurality of individual users is associated with a common defined workspace.

10. A computer program product for controlling energy utilization, the computer program product comprising a non-transitory computer useable storage medium having computer usable program code embodied therewith, the computer useable program code comprising:
    computer usable program code configured to receive scheduled user activities into an electronic calendar program through a software interface from each of a plurality of individual user nodes on a network;

computer usable program code configured to associate each user activity with a defined workspace having one or more remotely controllable electronic devices selected from the group consisting of an electrical outlet, computer, printer, light fixture, and combinations thereof; and computer usable program code configured to control energy utilization of the one or more electronic devices within each defined workspace according to the activity associated with the defined workspace;

computer usable program code configured to reduce energy utilization in one or more defined workspaces during a time period that there is no user activity associated with the one or more defined workspaces;

computer usable program code configured to detect that a user has logged onto a remote computer that is not located within the defined workspace; and computer usable program code configured to over-ride any of the scheduled user activities that are inconsistent with logging onto the remote computer.

11. The computer program product of claim 10, the computer useable program code further comprising:

computer usable program code configured to turn off the one or more remotely controllable electronic devices in response to receiving no scheduled user activity associated with the defined workspace in which the devices are located.

12. The method of claim 1, wherein the user activities are selected from a list of user-selectable activities provided by the electronic calendar.

\* \* \* \* \*